United States Patent [19]
Anaya-Dufresne et al.

[11] Patent Number: 6,144,528
[45] Date of Patent: Nov. 7, 2000

[54] AIR BEARING SLIDER WITH REDUCED STICTION

[75] Inventors: Manuel Anaya-Dufresne, Fremont; Pablo G. Levi, Sunnyvale; Mark J. Donovan, San Jose, all of Calif.

[73] Assignee: Read-Rite Corporation, Fremont, Calif.

[21] Appl. No.: 09/426,145

[22] Filed: Oct. 22, 1999

Related U.S. Application Data

[63] Continuation-in-part of application No. 09/178,588, Oct. 26, 1998.

[51] Int. Cl.$^7$ .................................................. G11B 17/32
[52] U.S. Cl. ................................................. 360/235.4
[58] Field of Search ............................. 360/235.4, 235.5, 360/235.6, 235.7, 235.8, 235.9, 236, 236.1, 236.2, 236.3, 103–105

[56] References Cited

U.S. PATENT DOCUMENTS

| | | | |
|---|---|---|---|
| 5,796,551 | 8/1998 | Samuelson | 360/103 |
| 5,940,249 | 8/1999 | Hendriks | 360/103 |

*Primary Examiner*—Allen T. Cao
*Attorney, Agent, or Firm*—Michaelson & Wallace

[57] ABSTRACT

The present invention is embodied in an air bearing slider. The slider contains a magnetic head for writing and reading data to and from the magnetic medium of a hard disk. The slider is attached to an actuator arm which reciprocates over the disk surface to position the slider over the surface of the disk. When placed in the airflow existing just above the surface of a rotating disk the slider flies above the disk. The slider which has a leading edge, a trailing edge and two sides defined between the leading and trailing edges comprises a pair of leading pads positioned near the leading edge, a channel defined between the leading pads, a side pad positioned adjacent to each of the sides respectively, a center pad positioned near the trailing edge and a cavity disposed between the pads. With the side pads being separate from the leading pads as well as the inclusion of the channel providing a reduction in stiction. Further, the present invention's configuration of elements provides a slider with a nearly constant flying height over the entire disk surface, even during changes in airflow velocity, skew angles and loading. Also, the slider possess high pitch and roll stiffness, which contributes to it ability to maintain a near constant flying height.

26 Claims, 3 Drawing Sheets

AIR BEARING SLIDER WITH REDUCED STICTION

This Application is a continuation-in-part of U.S. patent application Ser. No. 09/178,588 by Levi et. al., entitled AIR BEARING SLIDER, filed on Oct. 26, 1998, pending.

BACKGROUND OF THE INVENTION

1. Technical Field

The invention is related to the field of air bearing sliders for use in magnetic head assemblies.

2. Background

Computer disk drives store and retrieve data by using a magnetic head positioned close to a rotating disk with some magnetic material at or near its surface. The head operates to either write data onto the disk by aligning magnetic poles of the magnetic material or read data by sensing the alignment of the poles. Because the magnetic fields are relatively small, it is of critical importance that the head is kept very near the disk surface. Not only does this improve the writing and reading of data, but the closer the head can be placed, the greater the storage capacity of the disk can be.

In order to position magnetic heads at acceptable distances above the surface of disks, heads are typically mounted to air bearing sliders. An air bearing slider is a device which is specifically shaped so that when placed into the airstream existing close to the surface of a rotating disk, the slider will provide a lifting force to cause it to fly above the disk. As magnetic heads are normally much smaller than sliders, they can be mounted to sliders and flown with the slider above the disk. Flying the magnetic head by way of a slider allows the distance between the head and the disk surface to be kept relatively small and constant.

Usually, the slider and magnetic head assembly is bonded to an actuator arm which allows the slider to maintain a desired position relative to the disk surface. The actuator arm also enables reciprocation of the slider across the disk surface to precise positions over individual data tracks of the disk.

Usually, the slider will be in a pitched up attitude when it is flying. This attitude assists the slider to create a lifting force. Because the pitched up attitude places the trailing edge of the slider closest to the surface of the disk, the trailing edge is the desired location for placement of the magnetic head, which provides increased performance the closer it is kept to the disk surface.

Generally, as the airflow is increased, the slider will produce greater lift and thus raise to a higher position above the disk surface. This causes the slider to vary its height as its location along the radius of the disk is changed. The closer to the center of the disk the slower the airflow, lower the lift and thus the lower the slider will fly. The closer to the outer edge the slider is, the faster the airflow, greater the lift and the higher the slider will fly. However, changes in flying height are undesirable as a more constant flying height would allow the magnetic head to be positioned closer to the disk surface regardless of its radial location above the disk.

Of course, just as the slider can take-off, it also can land. When the disk is at rest, the slider and the disk are in contact. Upon startup, the friction force required to separate the slider and disk is referred to as "stiction". By causing a certain amount of torque on the disk, stiction can damage, or at the very least reduce the life of the disk motor. High stiction may cause the disk to not be able to begin turning and even if it can rotate the disk may not be capable of obtaining high enough rotation to allow the slider to take-off.

The 'skew angle' is the angle between the direction of the disk's tangential velocity (airflow) and the slider's longitudinal direction. Typically, a disk drive can have either a linear or a rotary actuator. With linear actuators the slider has little to no skew angle. With disk drives becoming more compact, manufactures have moved to using rotary actuators. With a rotary actuator the slider is mounted along a rotary arm. With a rotary actuator, the orientation (skew angle) of the slider with respect to the disk changes continuously. Generally, rotary actuators have skew angles of roughly ±12–13 degrees.

Variations in skew angle lead to variations in lift and therefore flying height. It is desired that sliders used with a rotary actuators be able to operate over a wide range of skew angles with a minimal variations to the flight height.

Flight height is also affected by other factors. For instance, significant pitching and/or rolling of the slider will adversely affect the flying height. Usually, as the slider pitches upward, the lift will increase and the slider will fly higher. Pitching down will have the opposite effect and decrease the flying height. The more variation in pitch, the less constant the flying height will be. Pitching can however be reduced by increasing the pitch stiffness of the slider. Likewise, increasing the roll stiffness will provide a more constant flying height as it will prevent the sides of the slider from dropping to close to the disk surface.

Variations in the loading of the slider will also affect the flying height. If the load is increased, then the slider will fly lower or will have to produce a greater lift force to maintain the same height. The degree to which the flying height will be affected by variations is loading is referred to as load sensitivity. A high vertical stiffness of the slider will provide a lower load sensitivity.

Many prior sliders have been designed with features intended to help maintain a more constant slider flying height. These devices have had varying degrees of success.

One of the early sliders is the 3370 thin film head slider of the IBM 3370 disk drive. FIG. 1 shows an example of a 3370 slider. This slider is a two rail taper-flat design supported by a leaf spring suspension. The read-write head is located at the trailing edge of each rail, such that with the slider pitched up relative to the surface of the disk, the read-write head is positioned close to the disk surface. For disk drives which used smaller disks, and therefore lower airflow velocities, the distance between the rails would be made wider to provide greater lift. Other modifications on this basic slider design included variations to the shape of the rails. For example, IBM produced the 3380K slider where each side rail had a widened leading edge rail that flared down to a smaller rail width towards the trailing edge.

Other prior sliders included those used for low-end applications having heads comprising a magnetic ring core and wound coil. These sliders included two types, the minimonolithic and the minicomposite. The minimonolithic slider was a tri-rail design. A taper-flat bearing area was provided by the outer two rails of the design. The center rail defined the width of the magnetic head located in the trailing edge. Although about the same size as the minimonolithic slider, the minicomposite slider lacked a sizable depression, or depressions, in the area between the rails as existed with the other designs.

One problem with these types of sliders was that as the slider traveled further outward on the disk, the increased airflow would produce greater lift and would cause the slider to fly progressively higher. This caused a direct decrease to the performance of the magnetic head. Further, because these designs had a very simple lifting mechanism, the sliders had low vertical and pitch stiffnesses. Also, the flat rails produced relatively high stiction values. When used with rotary actuators, these designs tended to be highly affected by the skew angles and performed poorly. The result was that these prior designs could not provide the nearly constant low flying height and stiffness required by the increasing data capacity requirements of modern disk drives.

Thus, a slider is sought which will maintain a low and nearly constant flying height and low stiction. To do so, the slider must have a low sensitivity to changes in airstream velocity. The slider must have a low skew sensitivity so that it can operate on a rotary actuator over the entire disk surface with little variation in the flying height. The slider must have an vertical stiffness great enough to minimize load sensitivity and possess pitch and roll stiffnesses high enough to minimize unwanted pitches and rolls. Of key importance is that the slider be configured to have reduced stiction values.

SUMMARY OF THE INVENTION

The slider, which has a leading edge, a trailing edge and two sides defined between the leading and trailing edges, comprises a pair of leading pads positioned near the leading edge, a channel defined between the leading pads, a side pad positioned adjacent each of the sides respectively, a center pad positioned near the trailing edge and a cavity disposed between the pads.

The slider obtains low stiction by incorporating the channel defined between the leading pads, as well as by having the side pads being displaced from the leading pads. Low stiction is important as it reduces the drag upon the disk, which increases performance, reduces torque on the disk, allows for the use of a smaller disk motor and may increase the life of the disk motor.

The leading pads, side pads and the center pads may each have a shallow step portion and an upper surface. The shallow steps are positioned in front of their respective pads, towards the leading edge of the slider, but lower than the pads's upper surfaces. The steps improve the pad's lift by causing a sudden change in the airflow at the interface between the pad and the step, so that the positive pressure over the pad is increased. This pressure increase causes the pad to produce greater lift. The shallow steps can be of any shape and can even wrap around to the sides of the pads. The shallows steps may have contoured upper surfaces, typically substantially coplanar with one another. These upper pad surfaces act as air bearing surfaces, creating a lifting force to lift the slider above the rotating disk. The closer the pads are placed towards both the leading and trailing edges, the further the distribution of lifting forces and the greater the pitch stiffness becomes. Similarly the nearer to the sides of the slider pads are, the greater the roll stiffness.

The leading pads may contain outer and inner rails extending back from the leading edge towards the trailing edge. The outer rails being positioned adjacent each of the slider's sides and having an upper surface. The outer rails can be used to control the pressure under the slider. The inner rails also extend from the leading edge back towards the trailing edge, but are positioned inboard of the outer rails. Also, the inner rails further define the channel which runs between the leading pads. The inner rails each have an upper surface, which can act as an air bearing surface to provide additional lift.

Typically the upper surfaces of the pads and rails are substantially coplanar. Further, the upper surfaces typically have a slight contour to reduce stiction and provide a lower take-off velocity. This contour can be the result of a common curved surface existing on the single piece slider prior to etching out the cavity, steps and channel during manufacture. Typically, the shallow steps are substantially coplanar with one another, having a height below that of the pads and rails. Also, the channel and cavity normally are substantially coplanar to one another and positioned below the shallow steps. Having the various surfaces of the slider substantially coplanar to one another allows for a simpler manufacture of the slider.

The channel and cavity are in communication with each other, such that air can flow through the channel, past by the leading pads and flow into the cavity. With air being compressed by flowing over the leading pads and then expended by flowing into and through the cavity, causes the cavity to develop a negative pressure (with respect to ambient pressure). This negative pressure applied over the surface of the cavity causes a negative force to be applied to the slider. This negative force forces the slider generally downwards towards the surface of the disk.

The read/write head is normally disposed at or near the trailing edge of the slider which, due to its typical pitched-up flying attitude, is the closest portion of the slider to the disk. Preferably, the read/write head is incorporated into the center pad, at or near the pad's trailing edge.

DETAILED DESCRIPTION OF THE PREFERRED EMBODIMENTS

In the preferred embodiments, the specific configuration and positioning of the slider's elements, including the pads, rails, air bearing surfaces, shallows steps, channel, and cavities, depend on the specific requirements of the particular use of the slider. Factors which define the particular use include the range of disk tangential velocities (disk size plus range of rotational speed), range of skew angles, allowable flying heights, maximum velocity sensitivity, maximum allowable stiction, maximum load sensitivity, minimum roll stiffness and minimum pitch stiffness. As these factors are varied the exact design of the slider will be changed accordingly.

Although the configuration and positioning of elements are variable, certain features of the invention are common to each embodiment. Namely, the slider has two leading pads separated by a channel, allowing air to pass between the leading pads. Also, the slider has two side pads and a center pad which are aft of the leading pads. The side pads being separate from the leading pads. The pads are positioned to at least roughly define a cavity.

Description of the relevant components of the disk drive:

The components of a typical disk drive relevant to the present invention include: a disk 4, an air bearing slider 10 and a rotary actuator arm 12.

Figure 1:
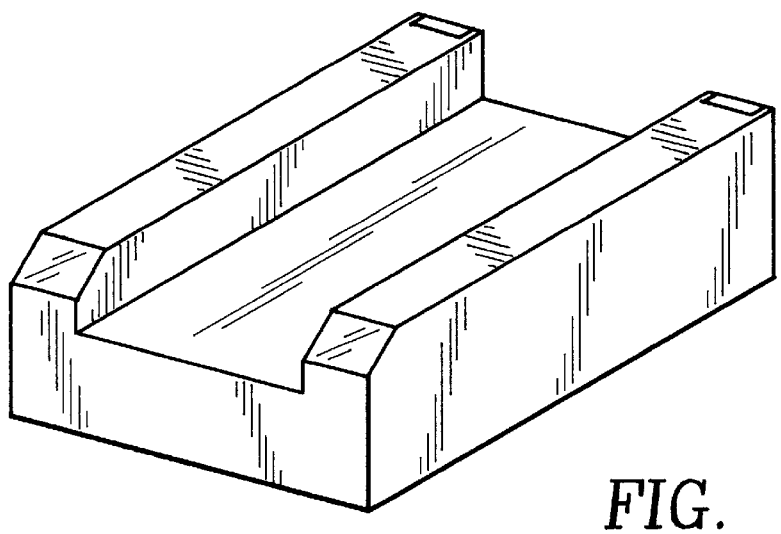
FIG. 1 is a perspective view showing an IBM 3370 thin film head slider.
Figure 2:
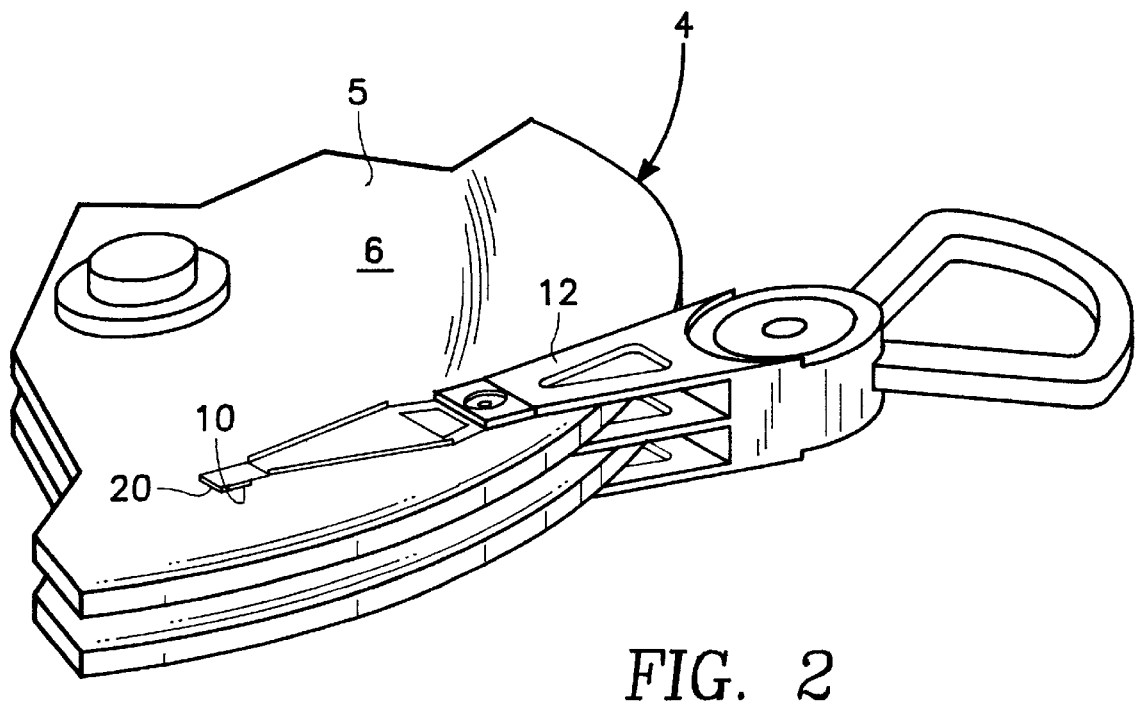
FIG. 2 is a perspective view showing relevant components of a disk drive.

The disk 4 has a disk surface 5, a magnetic material 6, as shown in FIG. 2. Disk surface 5 is located on disk 4, and as disk 4 rotates, the air just adjacent to disk surface is carried (dragged) along to produce an airflow in a relatively thin layer above the disk surface 5. At and/or just below disk surface 5 is a magnetic material 6.

The air bearing slider 10 operates to carry a magnetic head 20 close to the disk surface 5 so that the magnetic head 20 may either read or write data. As shown in FIG. 2, the magnetic head 20 is typically mounted at or very near the trailing edge of the slider 10. Slider 10 can incorporate a wide variety of different magnetic heads including, giant magneto-resistive (GMR) heads, magneto-resistive (MR) or inductive coil heads. The specifics of air bearing slider 10 is set forth in detail herein, including descriptions of its preferred embodiments.

Air bearing slider 10 is mounted to actuator arm 12, which moves slider 10 across the disk surface 5. The actuator arm 12 will typically apply a load on the slider 10 of about 2.5 grams.

Figure 3:
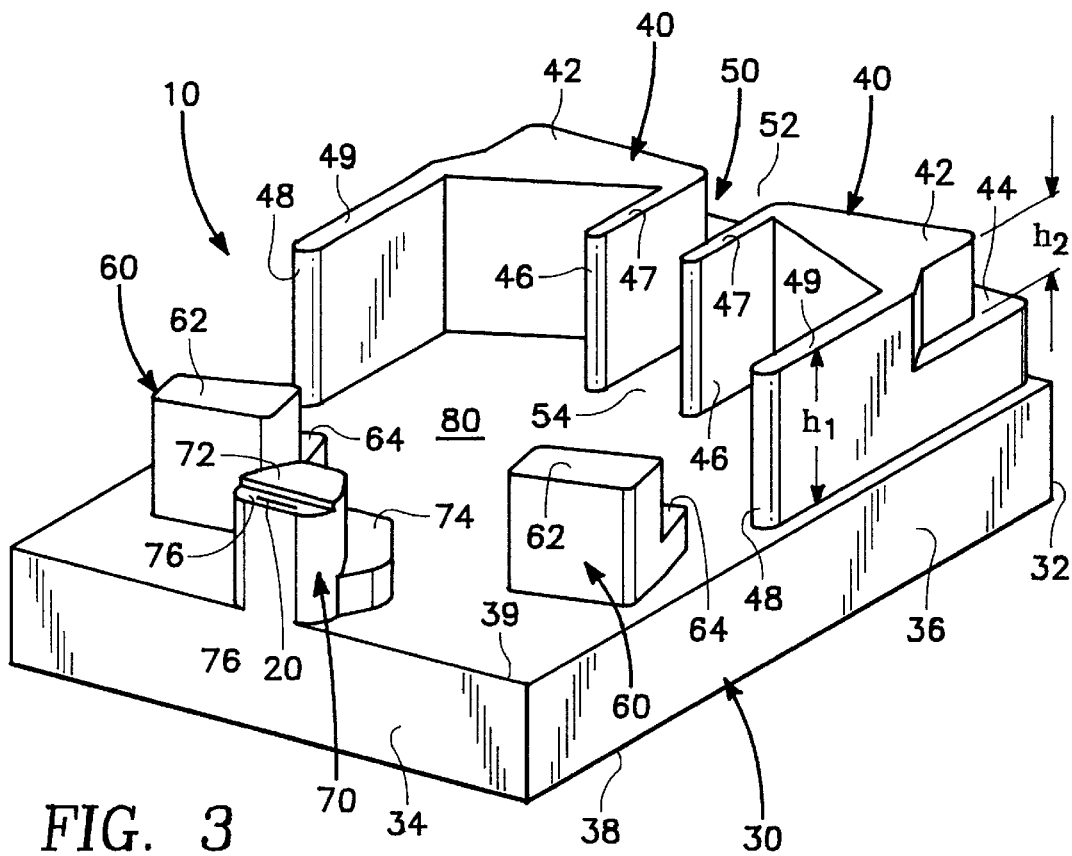
FIG. 3 is a perspective view of the air bearing slider.
Figure 4:
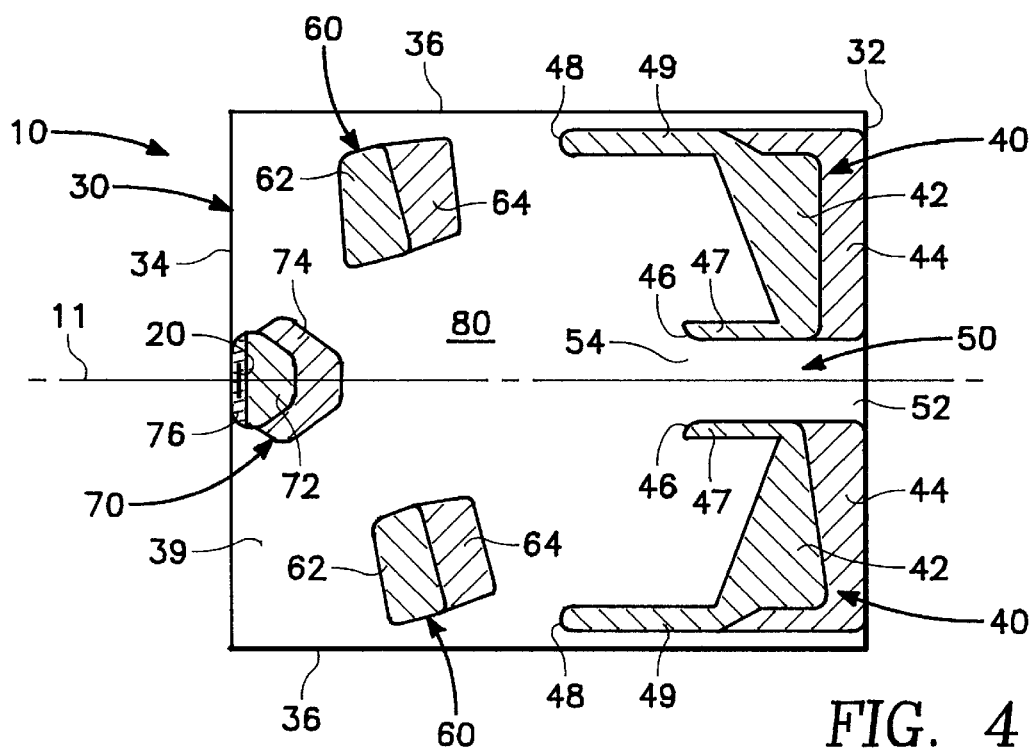
FIG. 4 is a top view of the air bearing slider.

Description of the preferred embodiment of the present invention:

The air bearing slider 10 comprises the following primary components: a magnetic head 20, a slider base 30, leading pads 40, a channel 50, side pads 60 and a center pad 70. FIGS. 3 and 4 show each of these primary components.

As shown in FIG. 3, the slider base 30 is rectangular in shape and includes a leading edge 32, a trailing edge 34, sides 36, upper surface 38 and lower surface 39. Normally, slider base 30 is positioned such that when in an airflow, the air generally flows first past the leading edge 32, then past sides 36 and lastly past trailing edge 34. With slider 10 having little to no skew angle, the leading edge 32 and trailing edge 34 will be roughly perpendicular with the airflow and sides 36 will be roughly parallel to the airflow. In the preferred embodiment, the slider base 30 is a rectangle with the leading edge 32 and trailing edge 34 each 39.4 milli-inches wide and the sides 36 each 49 milli-inches long. The slider 10 is attached to the actuator arm 12 at upper surface 38, typically at or near the center of upper surface 38. Also, preferably leading pads 40, side pads 60 and center pad 70 are all integral to the slider base 30, having been defined during manufacture when the cavities, channel and steps were etched out from an original single piece of material having a curved air bearing surface.

In the preferred embodiment, the slider 10 has two leading pads 40 which are separated and positioned near the leading edge 32. The leading pads 40 each include a leading air bearing surface 42, a leading shallow step 44, a leading inner rail 46 and a leading outer rail 48, as shown in FIGS. 3 and 4. Inner rails 46 are positioned on the inboard portion of the slider 10 adjacent one another, such as to define channel 50 between them near the center of the slider 10. However, depending of the specific use requirements, the channel 50 can be positioned off-center.

Leading edge air bearing surfaces 42 are positioned on each leading edge pad 40, as shown in FIGS. 3 and 4. These surfaces provide a lifting force to the slider 10 due to the positive pressure created by the airflow over the leading edge pads 40. Because it is preferred that slider 10 be manufactured by etching it from a single piece of material having a curved air-bearing surface (etching out the cavity 80, shallow steps 44, 64 and 74, and channel 50 to define the pads, rails and shallow steps), all the air bearing surfaces, including the leading edge air bearing surfaces 42, have a slight contour to their surfaces. It is preferred that this common curve of the air bearing surfaces be an elliptic paraboloid. This contour acts to reduce the stiction of the slider 10 and lower the take-off velocity, by minimizing the contact between the pads and the disk surface 5. The leading edge air bearing surfaces 42 are positioned a height $h_1$ from the lower surface 39, as shown in FIG. 4. It is preferred that this height be in the range of 40 to 100 micro-inches. The ideal height of the leading edge air bearing surfaces will vary depending on the rotational speed and size of the disk, as well as the specifics of the intended use.

Each leading pad 40 has a leading shallow step 44. As can be seen in FIGS. 3 and 4, the leading shallow steps 44 are positioned immediately after the leading edge 32 but mostly before the leading air bearing surface 42. In this position, the leading shallow steps 44 provide a step-up for the air flowing over slider 10. Although some positive pressure, and thus lift, is created by the leading shallow steps 44, their primary purpose is to create a sudden compression of the air near, or at, the interface between the shallow steps 44 and the air bearing surfaces 42. This sudden pressure change caused by the shallow steps 44 helps to create a much higher positive pressure on the leading pads 40. In turn, the increased positive pressure provides an increased lifting force on slider 10. Each leading shallow step 44 can be configured (shape, size, position and height) differently from the other shallow step 44, depending on the specific design requirement of the slider. Differences in the configuration of the shallow steps 44 include factors such as the skew angle range and the desired take-off velocity. For example, if the slider 10 is to be used in a disk drive which places the slider 10 in greater positive skew angles rather than negative angles, the shallow steps 44 can be shaped to be skewed to a certain extent to improve the slider's performance. Also, it has been found that to improve skew performance and decrease take-off velocity, the shallow steps 44 can be designed to wrap from the front of the pads 40 around to the sides of the pads 40, inner rails 46 and outer rails 48, as shown in FIGS. 3 and 4.

The leading shallow steps 44 have surfaces which are at a lower height, relative to lower surface 39, than are the leading edge air bearing surfaces 42. The leading shallow steps 44 are at a height $h_2$ below the air bearing surfaces 42. In the preferred embodiment, this height $h_2$ is in the range of 2–10 micro inches. The ideal height of the shallow steps will vary depending on the rotational speed and size of the disk, as well as the other specifics of the slider's use. As with creating the cavities and channel, it is preferred that the leading shallow steps 44 are manufactured by etching them out from a single piece of material, thus making the step integral with the slider base 30.

The leading edge inner rails 46 and leading outer rails 48 each extend back from the leading edge pads 40 toward the trailing edge 34, as seen in FIGS. 3 and 4. Typically, the inner rails 46 will not extend as far back towards the trailing edge 34 as the outer rails 48 will. The leading outer rails 48 generally are positioned close to, and run along, each side 36. Each inner or outer rail 46 and 48 can be configured (shape, size, position and height) differently from the other inner or outer rail, depending on the specific requirements of the intended use. For example, one inner rail could extend further back towards the trailing edge than the other inner rail. At the upper surface of the leading inner rails 46 are located the leading inner rail air bearing surfaces 47. Likewise, at the upper surface of the leading outer rails 48 are the leading outer rail air bearing surfaces 49. These air bearing surfaces provide a lift force to the slider 10 due to the air pressure exerted on them by the airflow. As with the leading air bearing surfaces 42, it is preferred that the rail air bearing surfaces 47 and 49 have a contoured surface to minimize stiction and take-off velocity. This contoured surface is provided by the preferred method of manufacturing the slider 10 from single piece of material having a curved air bearing contact surface from which the cavities, channel and steps are etched out. The height of the rails coincides with the height of the leading air bearing surfaces 42, between 40 to 100 micro-inches. This common height affords improvement in the manufacture of air bearing sliders and optimizes air flow across the air bearing surfaces. Of course, the ideal height of the rails will vary depending on the rotational speed and size of the disk, actuator arm used and the specific requirement from the slider's use.

During flight, inner rails 46 and outer rails 48 function to direct and contain the airflow in order to control the air pressure on the air bearing surfaces, steps and cavity, to provide improved flight characteristics. Specifically, the inner rails 46 and outer rails 48 tend to increase the negative pressure in the cavity caused by the airflow over it, thus increasing the downward force on slider 10. Between the inner rails 46 is defined the channel 50 which allows air to flow between the leading pads 40 into the cavity 80. The specific length and width of each rail can be varied in order to provide a particular desired performance. Factors including the rotational speed and size of the disk and the slider's use will effect the specific dimensions of the rails.

The channel 50 is shown in FIGS. 3 and 4. The channel 50 operates to carry air from at or near the leading edge 32 directly into cavity 80, without passing over the leading pad 40. The air enters the channel 50 at the channel entrance 52 which is situated at or near the leading edge 32. The air exits the channel 50 and enters the cavity 80 at the channel exit 54. This tends to increase the air flow over center pad 70 which can be positioned in line with the channel 50. The depth of the channel 50 will depend in part on the height $h_1$ of the leading air bearing surfaces 42 and the inner rail air bearing surfaces 47. The width, length and height of the channel 50 can be varied to meet the performance requirements sought for the particular intended use of the slider 10.

Figure 5:
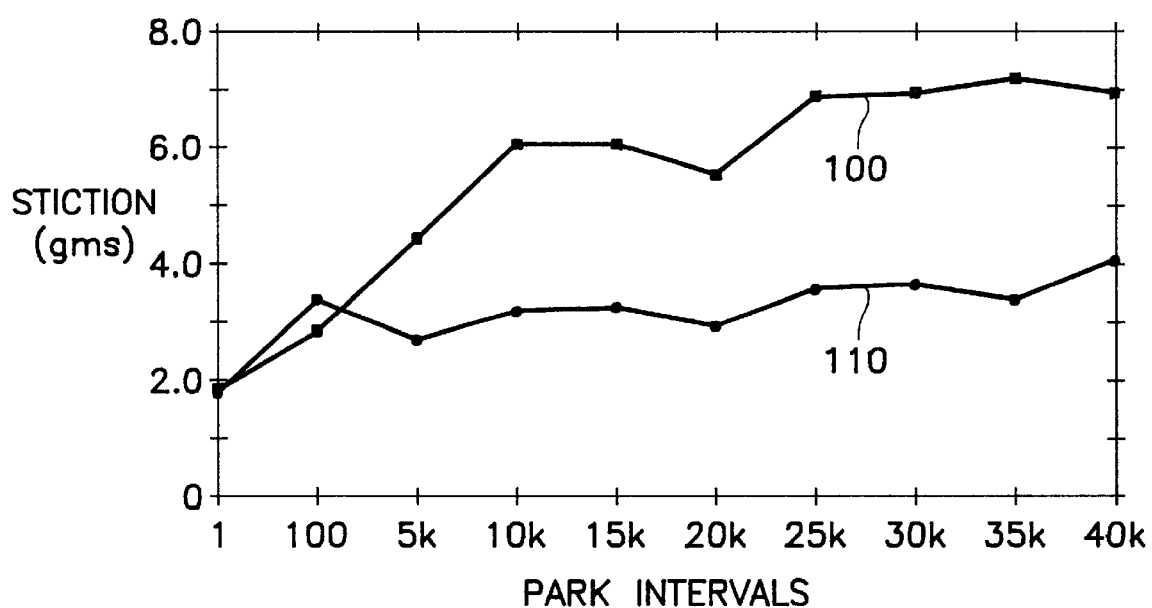
FIG. 5 is a chart of experimental data showing the reduction in stiction of the present invention compared to an air-bearing slider design lacking elements of the present invention.

Although the exact mechanism is unknown, it has been found through experimental testing that the channel 50 causes a reduction in the stiction values of the slider 10. Data showing this reduction is shown in FIG. 5. The graph of FIG. 5 shows stiction, measured in grams, verses the number of park intervals. A single park interval involves initially having the disk at rest and the slider resting, or 'parked', on the disk's surface, rotating the disk up to a prescribed speed which causes the slider to fly above the disk, and then bringing the disk to rest again and parking the slider. As shown in the graph of FIG. 5, stiction measurements are taken after the completion of a range of park intervals. In the graph line 100 show the stiction values measured using a slider lacking the channel 50 and side pads 60 elements of the present invention. The graph also includes line 110 which represent measured stiction values of a slider embodying the present invention. As can be seen, for nearly all park intervals, the stiction values of the slider embodying the present invention are greatly reduced from the stiction values of the slider lacking the channel 50 and side pads 60 elements of the present invention.

The side pads 60 each have a side pad air bearing surface 62 and a side pad shallow step 64. The side pads 60 are generally located near each of the sides 36 and back towards the trailing edge 34 from the leading pads 40. The side pads 60 can be shaped and located in order to meet the specific performance requirements of the slider's use. Generally, the further out towards the sides 36 the side pads 60 are placed, the greater the roll stiffness of the slider 10 will be. Likewise, the further aft, the greater the pitch stiffness of slider 10. The side pad air bearing surfaces 62 are each located at the upper surface of the sides pads 60. The side pad air bearing surfaces provide lifting forces to the slider 10 from the pressure created by the airflow over them. The shape of each side pad air bearing surface 62 can be of virtually any shape, but it is preferred that the surface have a slight contour to minimize the stiction and take-off velocity of the slider 10. This contour originating from the pre-etched slider which is a single piece of material with a curved air bearing surface. It is preferred that the curve of the signal piece of pre-etched material be an elliptic paraboloid. As with the other pads and rails of the slider 10, in the preferred embodiment the side pads 60 are integral with the slider base 30, having been defined by the etching out of the cavities during manufacture. Also, it is preferred that the side pads 60 have rounded corners to improve airflow.

Although the exact mechanism is unknown, it has been found through experimental testing that having the side pads kept distinct (separate) from the leading pads reduces the stiction values. Data showing this reduction is set forth in FIG. 5. In the graph of FIG. 5, line 100 show the stiction values measured using a slider lacking the channel 50 and side pads 60 elements of the present invention. The graph also includes line 110 which represent measured stiction values of a slider embodying the present invention. As can be seen, for nearly all park intervals, the stiction values of the slider embodying the present invention are greatly reduced from the stiction values of the slider lacking the channel 50 and side pads 60 elements of the present invention.

The side pad shallow steps 64 are platforms placed in front of each of the side pads. As with the other shallow steps of slider 10, although some positive pressure is created by the shallow steps 64, their primary purpose is to create a sudden change in pressure at the interface between the shallow steps 64 and the air bearing surfaces 62. This pressure change increases the positive pressure on the air bearing surfaces 62, thus increasing the lift generated by the side pads 60. The shallow steps 64 have a height below that of the air bearing surfaces 62. It is preferred that the height of the side pad shallow steps 64 $h_2$, coincide with the height of the leading shallow steps 44, simplifying the manufacturing process. The shape and size of the shallow steps 64 will depend on the performance requirements of the slider design for the particular intended use. The shallow steps 64 may even extend out close to the leading outer rails 46 and/or the leading outer rails 48. However, it is preferred that the shallow steps 64 are shaped to extend outward in front of the side pad air bearing surfaces 62 but not contact another pad and/or rail.

The center pad 70 includes center pad air bearing surface 72, center pad shallow step 74 and center pad trailing edge 76. The center pad 70 is typically positioned near the center of slider base 30 and near the trailing edge 34. The exact position depending on the performance requirements of the slider design for a particular use. For example, if increased pitch stiffness is required, then the center pad 70 can be moved further back towards the trailing edge 34. Although, it is preferred that center pad 70 be located close to the trailing edge 34 to allow magnetic head 20 to be positioned as close as possible to the disk surface 5 when slider 10 is in a pitched-up attitude. The size and shape of center pad 70 will also depend on the specific performance requirements of the slider design for the particular use. However, it is preferred that the center pad 70 be generally oval in shape with rounded corners to improve airflow.

The air bearing surface 72 provides a lifting force to the slider 10 from the air pressure asserted on it by the airflow.

As with the other pads and the rails, it is preferred that the center pad air bearing surface 72 have a slight contour to minimize the stiction and take-off velocity of slider 10. This contour, originating from the curved air bearing surface of the pre-etched slider material piece. Preferably this curve is an elliptic paraboloid.

Center pad shallow step 74 generally extends in front of the remaining portion of the center pad 70. Shallow step 74 can wrap around the sides of center pad 70 as well. As with the other shallow steps of slider 10, although some positive pressure is created by the shallow step 74, its primary purpose is to create a sudden change in pressure at the interface between the shallow step 74 and the air bearing surface 72. This pressure change increases the positive pressure on the air bearing surface 72, thus increasing the lift generated by the center pad 70.

The center pad trailing edge 76 is located at the back of the center pad 70. Although the magnetic head 20 can be mounted anywhere in the slider 10 it is preferred that it is mounted in the trailing edge 76 so that the head 20 will be as close as possible to disk surface 5 when slider 10 is in a pitched-up attitude. As such, in the preferred embodiment, the center pad trailing edge 76 is a structure rising to a height above the lower surface 39 such that it is about 0.3 microinches below the center pad air bearing surface 72. This positioning of the magnetic head 20 (as close to the disk surface as nearly possible) allows increased performance from magnetic head 20 and thus increased storage on disk 4. The preferred material for the trailing edge 76 is aluminum titanium carbide. Also, it is preferred that the trailing edge 76 includes a small band of alumina where the magnetic head is placed.

Cavity 80 is defined by the leading pads 40, the side pads 60 and center pad 70. Cavity 80 is created during the manufacturing process when material is etched out between the pads. As a roughly concave shape, cavity 80 operates to provide a force opposite to the lift forces created by the air bearing surfaces. That is, the air pressure resulting from air flowing over cavity 80 produces a force on slider 10 directed generally towards the disk surface 5. This negative force acts to counteract the lift force developed by the air bearing surfaces 42, 47, 49, 62 and 72. This negative force maintains the slider 10 at a desired flying height above the disk surface 5. The effect of the lift forces and the counteraction of negative force causes the slider 10 to have a certain vertical stiffness. This stiffness reduces the sensitivity of slider 10 to changes in airflow velocity, skew angles, to changes in loading by the rotary actuator arm 12 and to changes in the altitude (above sea level) at which the disk drive is operating. The reduced sensitivity to airflow velocity changes allows the slider 10 to maintain a more constant flight height over different positions of the rotating disk 4. The reduced loading sensitivity increases the ability of slider 10 to maintain a constant flight height above the disk surface 5. In the preferred embodiment, the values of the lifting force, the negative force and the resulting vertical stiffness, will all be dependent on the specific configuration of elements used to meet the requirements of the particular use.

During operation, as the airflow created by the rotating disk 4 flows pass slider 10, causing slider 10 to fly above the disk surface 5 at a low enough height to allow the magnetic head 20 to be sufficiently close so as to be capable of writing and reading data to and from the magnetic material 6. The airflow will typically flow from the leading edge 32 towards the trailing edge 34. As slider 10 is flying it will normally be pitched-up at an angle relative to the disk surface 5, such that the leading edge 32 is higher above disk surface 5 than the height of trailing edge 34. The exact flying height and pitch angle will be dependant on the velocity of the airflow and the specific configuration of the slider 10. However, typically it is desirable to keep the leading edge 32 at least 3 microinches above the trailing edge 34.

As air flows over the leading pads 40 (with inner rails 46 and outer rails 48), side pads 60 and center pad 70, a positive pressure is developed (with respect to ambient pressure). This positive pressure applied to the area of the slider 10 under which it is created, produces a lifting force for lifting the slider 10 above the rotating disk surface 5. In turn, the air flowing over cavity 80 develops a negative pressure (with respect to ambient pressure). This negative pressure, applied to the area of the slider 10 under which the negative pressure is created, causes a negative force to be applied to the slider 10, such that the slider 10 is drawn towards the disk surface 5. This negative force at least in part counteracts the lifting force. The application of both the lifting force and the negative causes to slider 10 to maintain a desired flying height above disk surface 5.

The various configurations of the elements of the slider 10 including the shape, size and positioning of the pads, rails, steps channel and cavity, are optimally designed to cooperate with one another to regulate the levels and application of the positive pressures (thus the lift forces) and the negative pressures (the negative force) on slider 10. This regulation of pressures is done to achieve the requirements of limited (small) deviations in flying height (to maintain constant flying height), increased vertical stiffness, increased roll stiffness, increased pitch stiffness, reduced skew sensitivity and reduced stiction.

While the invention has been described in detail by specific reference to preferred embodiments, it is understood that the above description is not limiting of the disclosed invention and variations and modifications thereof may be made without departing from the true spirit and scope of the invention. For instance, the geometry and configuration of the elements, including the pads, steps, rails, channel and cavity, may be modified. Further, the position and size of the elements as well their placement relative to each other, can vary.

What is claimed is:

1. A slider having a leading edge, a trailing edge and two sides defined between said leading and trailing edges comprising:

(a) a pair of leading pads positioned near said leading edge, wherein at least one leading pad comprises an integral stepped surface, wherein said stepped surface is sized and positioned so that an increased positive pressure is achieved over said leading pad as an airflow passes over said leading pad;

(b) a channel defined between said leading pads;

(c) a side pad positioned adjacent to each of said sides respectively, wherein each said side pad is displaced from said leading pads;

(d) a center pad positioned near said trailing edge; and (e) a cavity disposed between said pads.

2. The slider of claim 1, wherein said stepped surface has a leading pad shallow step and a leading pad upper surface, said leading pad shallow step being positioned adjacent to said leading edge, said leading pad shallow step being lower than said leading pad upper surface.

3. The slider of claim 2, wherein at least one of said side pads further comprise a side pad shallow step and a side pad upper surface, said side pad shallow step being positioned towards said leading edge, said side pad shallow step being lower than said side pad upper surface.

4. The slider of claim 3, wherein said center pad further comprises a center pad shallow step and a center pad upper surface, said center pad shallow step being positioned towards said leading edge, said center pad shallow step being lower than said center pad upper surface.

5. The slider of claim 4, wherein said leading pads each have an outer rail extending from each said leading pad towards said trailing edge adjacent to each of said sides respectfully, said outer rail having an outer rail upper surface, and wherein each said outer rail is narrower than said leading pad from which each said outer rail extends.

6. The slider of claim 5, wherein said leading pads each have an inner rail extending from each said leading pad towards said trailing edge, said inner rails being positioned inboard of said outer rails, wherein said inner rails further define said channel, said inner rails each have an inner rail upper surface, and wherein each said inner rail is narrower than said leading pad from which each said inner rail extends.

7. The slider of claim 6, wherein said leading pad upper surface, side pads upper surface, center pad upper surface, outer rail upper surface and inner rail upper surface are substantially coplanar.

8. The slider of claim 7, wherein said leading pad shallow step, side pad shallow step and said center pad shallow step are substantially coplanar at a height below said pads and rails.

9. The slider of claim 8, wherein said channel and cavity are substantially coplanar below said shallow steps.

10. The slider of claim 9, wherein said channel and cavity are in communication, such that air can flow through said channel and into said cavity.

11. The slider of claim 1, further comprising a read/write head mounted near said trailing edge.

12. The slider of claim 6, wherein said leading pad upper surface, side pads upper surface, center pad upper surface, outer rail upper surface and inner rail upper surface are each contoured with a common curve so to reduce stiction of said slider.

13. A air bearing slider having a leading edge, a trailing edge and two sides defined between said leading and trailing edges comprising:

A. a pair of leading pads positioned near said leading edge, each said leading pads having a leading pad shallow step portion and a leading pad air bearing surface, said leading pad shallow step being positioned adjacent to said leading edge, said leading pad shallow step being lower than said leading pad air bearing surface, said leading pads having at least one rail extending back towards said trailing edge;

B. a channel defined between said leading pads;

C. a side pad positioned adjacent to each of said sides respectively, each said side pad having a shallow step portion and a side pad air bearing surface, said side pad shallow step being positioned towards said leading edge, said side pad shallow step being lower than said side pad air bearing surface wherein each said side pad is displaced from said leading pads;

D. a center pad positioned near said trailing edge, said center pad having a center pad shallow step portion and a center pad air bearing surface, said center pad shallow step being positioned towards said leading edge, said center pad shallow step being lower than said center pad air bearing surface; and E. a cavity disposed between said pads and in communication with said channel.

14. The air bearing slider of claim 13, wherein said read/write head is disposed in said center pad.

15. The air bearing slider of claim 13, wherein said air bearing surfaces are contoured with a common curve to reduce stiction of said slider.

16. The air bearing slider of claim 13, wherein said cavity has a substantially flat surface, wherein said channel has a substantially flat surface which is substantially co-planar with the surface of said cavity and below said shallow steps.

17. The air bearing slider of claim 16, wherein said shallows steps are substantially flat and co-planar to one another.

18. The air bearing slider of claim 13, wherein said cavity has a substantially flat surface, wherein said air bearing surfaces are between 40–100 micro-inches above said cavity surface, and wherein said shallow steps are substantially flat and are between 2–10 micro-inches below said air bearing surface.

19. A slider having a leading edge, a trailing edge and two sides defined between said leading and trailing edges comprising:

(a) a pair of leading pads positioned near said leading edge, (b) at least one rail connected to a leading pad of said pair of leading pads, wherein said at least one rail extends from said leading pad towards said trailing edge, wherein said at least one rail is narrower than said leading pad;

(b) a channel defined between said leading pads, wherein said channel separates said leading pads;

(c) a side pad positioned adjacent to each of said sides respectively;

(d) a center pad positioned near said trailing edge; and (e) a cavity disposed between said pads.

20. The slider of claim 19, wherein said at least one rail comprises two rails, and wherein each leading pad of said pair of leading pads is connected to one of said two rails.

21. The slider of claim 19, wherein said at least one rail comprises two outer rails and two inner rails, wherein each leading pad of said pair of leading pads is connected to one of said two of outer rails, wherein each said outer rail extends from said connected leading pad towards said trailing edge adjacent to each of said sides respectfully, wherein said outer rails each have an outer rail upper surface, wherein each leading pad of said pair of leading pads is connected to one of said two of inner rails, wherein each said inner rail extends from said connected leading pad towards said trailing edge, said inner rails are positioned inboard of said outer rails and further define said channel, and wherein said inner rails each have an inner rail upper surface.

22. The slider of claim 19, wherein at least one leading pad comprises a stepped surface.

23. The slider of claim 21, wherein each of said pair of leading pads further comprise a stepped surface, wherein said stepped surface has a leading pad shallow step and a leading pad upper surface, wherein said leading pad shallow step is positioned adjacent to said leading edge, and wherein said leading pad shallow step is lower than said leading pad upper surface.

24. The slider of claim 23, wherein said leading pad upper surfaces, outer rail upper surfaces and inner rail upper surfaces are substantially coplanar.

25. The slider of claim 24, wherein said leading pad upper surfaces, outer rail upper surfaces and inner rail upper surfaces are contoured with a common curve so to reduce stiction of said slider.

26. The slider of claim 19, wherein said channel and cavity are in communication, such that air can flow through said channel and into said cavity.

* * * * *